3,669,719
COMPOSITE ARTICLES HAVING METALLIC COATING WITH HIGH TEMPERATURE LUBRICITY
Clinton M. Doede, Hamden, and Eugene E. Combs, Northford, Conn., assignors to Quantum, Inc., Wallingford, Conn.
No Drawing. Filed Mar. 2, 1970, Ser. No. 15,866
Int. Cl. C23c 7/00
U.S. Cl. 117—93.1 PF                                6 Claims

ABSTRACT OF THE DISCLOSURE

Metal coatings on non-metallic and metallic substrates, including bearing metal alloy coatings exhibiting lubricity at high temperatures, are prepared by directing a plasma flame at a non-metallic substrate, such as a polyimide substrate or a metal substrate such as titanium, stainless steel, etc. and injecting into one of the gas streams entering the said plasma flame a copper-nickel-indium alloy in solid particulate form and depositing on the said substrate an adherent, dense coating having high temperature surface lubricity.

---

This invention relates to composite articles comprising metallic coatings on non-metallic and metallic substrate wherein the coating is applied by plasma arc techniques.

A number of methods are set forth in the art for preparing composite products comprising a non-metallic or metallic substrate having deposited on the surface a metal coating. Likewise, processes are well known in the art for the preparation of ceramic, metallo-ceramic or metallic coatings suitable for resisting high temperatures of up to about 1500° C. or more, as for example, in combustion turbines and thermoenergy installations, in general, which have been applied to metal substrates using the plasma arc process. Coatings highly resistant to abrasion and to chemical aggressive media have also been prepared using this same method. Materials such as aluminum, aluminum oxide, beryllium, beryllium oxide, boron carbide, calcium zirconate, chromium, chromium boride, magnesium oxide, molybdenum, nickel, niobium carbide, have been employed, utilizing the plasma arc method for the coating of many metal substrates. In the plasma arc process, the particles of metals are propelled or conveyed at sonic or supersonic velocity to the base material or metal, impinging thereon to form a high density deposit and one of the particular advantages of this technique is that the base material or metal need not be heated above its temper or heat treatment critical temperature to obtain good adhesion, cohesion, bonding, sealing, plating or cladding qualities.

A particular disadvantage of the bearing surfaces prepared by coating metals with alloys and metal compositions known in the art has been that at high temperatures these materials possess a very low degree of lubricity. As a result where such coated materials have been employed, for example, as liners or cushion inserts in clamping devices, operating at high temperatures where high frictional and compressive forces are developed between the insert and the object being clamped, the clamped object lacking any possible freedom of axial or sliding movement is prone to rupture the clamping device.

One of the main objects of this invention is to provide a metal-coated non-metallic or metallic substrate in which the coating thereon is a nickel-copper-indium alloy.

Another object of this invention is to provide a metal coated non-metallic or metallic substrate in which the coating thereon exhibits substantial lubricity at temperatures of about 2000° F. and above.

Another object of this invention is to provide metal-coated non-metallic and metallic substrates having lubricity properties at high temperatures which can be conveniently prepared by the plasma arc process.

A further object of this invention is to provide a plasma flame material which upon being passed through a plasma arc will produce directly a fused, dense coating which may be ground and finished to a very high surface finish.

In general this invention comprises forming metal coatings on non-metallic and metallic substrates, including bearing metal alloy coatings exhibiting lubricity at high temperatures, by directing a plasma flame at the said substrate which can be, for example, a polyimide substrate or a metal such as stainless steel, aluminum, etc., injecting into one of the gas streams entering the said flame a coating metal or alloy in solid particulate form and depositing on the said substrate an adherent, dense coating.

A wide variety of plastics are useful as the non-metallic substrates including both thermosetting and thermoplastic materials. Suitable plastics include polycarbonates, polysulfones, polyvinyl chloride, polyolefins, fluorinated polyolefins, phenol-formaldehyde, polyurethanes, fluorosilicones, polyimides, ABS, polyesters, polystyrene, polyphenylene oxides, poly-p-propylene, polybenzimidazoles, etc. In a like manner any desired metal or alloy can be employed as the metallic substrate, such as stainless steel, aluminum, titanium, steel, zinc, bronze, brass, copper, etc. The substrate, can also be a polyester or epoxy resin reinforced, if desired, with glass fiber or wire, asbestos or asbestos reinforced with a thermosetting or thermoplastic resin such as a fluorosilicone, etc., or with wire or wire screen or rubber and rubber reinforced with glass fiber, wire, wire screen, etc. Composite substrates such as polyvinyl chloride coated aluminum, etc. may also be employed.

Generally, where the substrate is metal its surface is cleaned by immersing it in an alkaline soak cleaner and afterwards roughened by treatment with emery cloth or by blasting with steel grit, such as G-18 or SAE T-25 grit in a pressure-type blast machine at 50 to 150 p.s.i. air pressure. Likewise, the non-metallic substrate is preferably blasted or roughened slightly using silicon carbide or aluminum oxide grit having a mesh size of about 24 to about 60 in a pressure-type blast machine at about 25 to about 50 p.s.i. air pressure. Alternatively, plastic substrates can be chemically etched with, for example, an aqueous chromic-sulfuric acid solution.

As previously pointed out, the metal spraying or coating of the non-metallic or metallic substrates by the process of this invention is effected by a plasma flame spray gun of the type, for example, which produces a plasma flame in which an electric arc is constricted in a nozzle with the plasma-forming gas. Plasma arc guns of this type which produce a plasma flame in the manner described are illustrated in U.S. Pats. 2,960,594, 3,304,402, etc. In the plasma arc spraying process the powdered alloy is introduced tangentially into the high temperature plasma stream or arc developed by the gun where the powdered particles are heated to a plastic or molten state and ejected through the orifice of the front electrode of the plasma gun and are then impinged at a very high velocity on the substrate which has been properly prepared for effective bonding.

The temperature of the plasma arc may be as high as 20,000° F. although generally the temperatures range from about 12,000° to about 15,000° F. The amount of the carrier gas used is preferably the minimum quantity required to convey the particle materials into the arc and depends on the particular construction of the gun. In general, for example, the amount of carrier gas is about 2 to about 20 normal cubic feet per pound of the powder sprayed per hour. Any of the conventional plasma-forming gases may be used in the process of this invention, such as argon, helium, nitrogen, hydrogen, etc.

Generally, the plasma flame spray gun is operated at about 200 to about 600 amperes at voltages ranging from about 20 to about 150 D.C. Preferably, the gun is operated at about 275 to about 500 amperes with a voltage of about 20 to about 80 D.C. Usually the plasma forming gas is introduced into the gun at a pressure of about 40 to about 85 p.s.i.g. and at a flow rate of about 30 to about 200 cubic feet per hour at standard conditions.

The thickness of the alloy metal coating developed on the non-metallic or metallic substrate may be varied over a wide range. Generally, the thickness will be between about 0.002 and about 0.050 inch and, preferably, will vary from about 0.005 to about 0.025 inch. The coating, as plasma sprayed, automatically fuses in place and a separate fusion step is not required.

Alloy compositions useful as spraying materials in the process of this invention may be varied over a wide range as follows:

| | Percent by weight |
|---|---|
| Nickel | 33–40 |
| Indium | 3–7.5 |
| Iron | 1 [1] |
| Copper | Balance |

[1] Maximum.

An especially useful range of compositions of these metal alloys are those in which the amount of nickel varies from about 35 to about 37% by weight, the amount of indium varies from about 4 to about 5.5% by weight, up to a maximum of 1% by weight of iron with the balance being copper.

The nickel-copper-indium powder should generally have a particle size below 100 mesh U.S. standard screen size and +8 microns, preferably between −230 mesh and +15 microns.

The following examples illustrate various embodiments of this invention and are to be considered not limitative:

EXAMPLE I

In this example the alloy powder is 35% by weight nickel, 4.8% by weight indium, 0.80% by weight of iron with the balance being copper, and the mesh size is between −270 and +15 micron. This powder is flame sprayed onto mild steel plate which has been surface cleaned with emery cloth. Spraying is conducted at a distance of about 7" from the plate using a plasma flame spray gun sold by Metco, Inc. of Westbury, N.Y. operating at 400 amps, 100 volts D.C. to produce a temperature of about 13,000° F. In this example, powder is passed through the plasma arc at the rate of 6 to 9 pounds per hour, using as the plasma medium a gas consisting of 90% by volume of nitrogen and 10% by volume of hydrogen at a pressure of 50 p.s.i.g. and a flow rate of 125 cubic feet per hour (STP). A self-fused, dense, adherent coating builds up on the metal substrate to a layer thickness of about 0.020".

EXAMPLE II

A titanium plate about ¼" thick and 2" square is first degreased by immersing it in a trichloroethylene bath at 150° F. and then roughened by blasting with SAE T25 steel grit in a pressure type blast machine at an air pressure of 105 p.s.i.g. The plate is then placed about 3" in front of the outlet nozzle of a plasma arc spray gun and is sprayed with an alloy powder containing 37% by weight of nickel, 5.3% by weight of indium, about 0.70% by weight of iron with the balance being copper and having mesh size between −325 mesh and +8 microns. During the plasma spraying operation the pressure of the nitrogen gas is set at 50 p.s.i.g. and the flow rate is about 90 cubic feet per hour measured at standard conditions. The particulate alloy composition was introduced into the plasma arc at the rate of about 5 pounds per hour. The resulting coating formed on the titanium substrate is uniform, adherent and very dense.

EXAMPLE III

In this example, a polypropylene sheet having a thickness of about 0.0084", after being roughened by treatment with a chemical etchant, is coated with an alloy powder containing 35% by weight of nickel, 4.3% by weight of indium, about 0.95% by weight of iron with the balance being copper, and having a particle size between −200 mesh and +325 mesh. The powder mixture is flame sprayed onto the plastic sheet at a distance of about 4" from the plate using a plasma flame spray gun Type 2M as sold by Metco, Inc. of Westbury, N.Y., operating at 500 amps, 50–55 volts D.C. to produce a plasma temperature of about 10,000° F.

In this example, spraying is carried out at the rate of about 8 pounds of powder per hour with a gas composition of 90% argon and 10% hydrogen by volume at a pressure of 60 p.s.i.g. and a flow rate of 150 cubic feet per hour (STP). The spray coating produced on the polyimide base is a dense layer having a thickness of about 0.025" which adheres tightly to the plastic substrate.

EXAMPLE IV

A cushion insert consisting of two arcuate segments of molded polyimide suitable for use in a multi-purpose conduit clamp is first chemically etched for 5 minutes in an aqueous chromic-sulfuric acid solution at 180° F. in order to roughen the surface. An alloy powder having a composition of 33% by weight of nickel, 5% by weight of indium, about 0.55% by weight of iron with the balance being copper and having a particle size varying from about −200 and +325 mesh is sprayed onto one face of the plastic employing a plasma flame spray gun type 2M as sold by Metco, Inc. of Westbury, N.Y. operating at 300 amps, 30 volts D.C. to produce a plasma temperature of about 10,000° F. The flow rates are maintained through the plasma gun so that the rate of spraying is about 4 pounds of powder per hour with a gas having a composition of 90% argon and 10% hydrogen by volume at a pressure of 50 p.s.i.g. and a flow rate of 160 cubic feet per hour (STP). The alloy coating produced on the face of the polyimide article is a dense coating which is built up to a thickness of about 0.020".

Scotch tape is applied to the coated surface of the plastic substrate and when it is pulled away there is very little particle pull-out.

EXAMPLE V

Using the same apparatus and experimental conditions set forth in Example IV and the same alloy composition utilized in that example, a dense, adherent alloy coating is built up to a layer thickness of about 0.018" on the surface of sheets of the following substrates having dimensions of 4" x 4" x 0.025";

(a) polyurethane
(b) tetrafluoroethylene
(c) polyethylene
(d) polysulfone
(e) ABS
(f) asbestos impregnated with fluorosilicone
(g) polyphenylene oxide
(h) polystyrene
(i) glass fiber reinforced epoxy.

What is claimed is:
1. An article exhibiting substantial surface lubricity at temperatures of about 2000° F., comprising a substrate selected from the group consisting of metallic and non-metallic materials, and an alloy metal coating bonded to a surface of said substrate, said alloy metal consisting essentially, by weight, of about 33 to 40% nickel, about 3 to 7.5% indium, up to a maximum of 1% iron, the balance being copper.

2. The article of claim 1 wherein said alloy coating has been applied by the plasma arc flame method of spraying of said alloy in powdered form onto said substrate surface.

3. The article of claim 1 wherein the said substrate is a metallic substrate.

4. The article of claim 3 wherein the said substrate is selected from the group consisting of titanium, molybdenum, steel, stainless steel, aluminum, copper, bronze and brass.

5. The article of claim 1 wherein the said substrate is a non-metallic substrate.

6. The article of claim 5 wherein the said substrate is selected from the group consisting of fluorinated polyolefins, polyolefins, polyurethanes, polystyrene, polysulfones, polybenzimidazoles, poly-p-xylene, fluorosilicones, polyphenylene oxides, ABS, polyvinylchloride, polyimides, asbestos and rubber.

References Cited

UNITED STATES PATENTS

| | | | |
|---|---|---|---|
| 3,254,970 | 6/1966 | Dittrich et al. | 29—183.5 |
| 2,988,447 | 6/1961 | Hoppin | 75—159 |
| 2,920,001 | 1/1960 | Smith et al. | 117—105.2 X |
| 3,279,939 | 10/1966 | Yenni | 117—138.8 R |
| 2,178,149 | 10/1939 | Strickland | 29—199 X |
| 3,293,029 | 12/1966 | Broderick et al. | 75—159 |
| 3,469,301 | 9/1969 | Freyberger et al. | 117—105.2 X |
| 3,471,310 | 10/1969 | Joseph et al. | 117—105 X |

FOREIGN PATENTS

| | | | |
|---|---|---|---|
| 1,300,764 | 8/1969 | Germany | 117—138.8 R |

ALFRED L. LEAVITT, Primary Examiner

J. H. NEWSOME, Assistant Examiner

U.S. Cl. X.R.

29—196, 196.1, 196.2, 196.3, 196.6, 197, 198, 199; 117—131, 138.8 R, 160 R